US012470903B2

(12) United States Patent
Gidla et al.

(10) Patent No.: US 12,470,903 B2
(45) Date of Patent: Nov. 11, 2025

(54) PERSONAL PROTECTIVE EQUIPMENT COMMUNICATION SYSTEMS AND METHODS

(71) Applicant: 3M INNOVATIVE PROPERTIES COMPANY, St. Paul, MN (US)

(72) Inventors: Vijay K. Gidla, Värnamo (SE); Magnus K. Petersson, Halmstad (SE); Henrik J. Sjöman, Skillingaryd (SE); David L. Albean, Indianapolis, IN (US); Paul D. Henry, Carmel, IN (US); James L. Fiocca, Carmel, IN (US)

(73) Assignee: 3M Innovative Properties Company, St. Paul, MN (US)

( * ) Notice: Subject to any disclaimer, the term of this patent is extended or adjusted under 35 U.S.C. 154(b) by 246 days.

(21) Appl. No.: 17/905,777

(22) PCT Filed: Mar. 1, 2021

(86) PCT No.: PCT/IB2021/051690
§ 371 (c)(1),
(2) Date: Sep. 7, 2022

(87) PCT Pub. No.: WO2021/181195
PCT Pub. Date: Sep. 16, 2021

(65) Prior Publication Data
US 2024/0214792 A1  Jun. 27, 2024

Related U.S. Application Data

(60) Provisional application No. 62/986,956, filed on Mar. 9, 2020.

(51) Int. Cl.
*H04W 4/80* (2018.01)
*H04B 1/715* (2011.01)
(Continued)

(52) U.S. Cl.
CPC .............. *H04W 4/80* (2018.02); *H04B 1/715* (2013.01); *H04B 5/72* (2024.01); *H04W 16/14* (2013.01);
(Continued)

(58) Field of Classification Search
CPC ....... H04W 4/80; H04W 16/14; H04W 84/18; H04B 5/72; H04B 1/715; H04B 2001/7154
(Continued)

(56) References Cited

U.S. PATENT DOCUMENTS 10,218,450 B1 * 2/2019 Ramsubbaraj ......... H04B 15/00
10,536,950 B2  1/2020 Filoche et al.
(Continued)

FOREIGN PATENT DOCUMENTS

CN  105897302 B * 7/2019 ............. H04B 1/715
EP  2869659 A1  5/2015
(Continued)

OTHER PUBLICATIONS

International Search Report for PCT International Application No. PCT/IB2021/051690, mailed on May 26, 2021, 4 pages.

*Primary Examiner* — Mong-Thuy T Tran
(74) *Attorney, Agent, or Firm* — Katherine M. Scholz; Jonathan V. Sry

(57) ABSTRACT

A short-range communication system is presented that includes a system control unit and a personal protective equipment device. The system control unit includes a network creator configured to create a short-range network on a wireless frequency, an interference detector configured to detect a device on an interfering frequency, and a control unit frequency hopper configured to, based on the detected device, scan a frequency range for an open frequency and switch the system control network to the open frequency.

(Continued)

The personal protective equipment device includes a network joiner configured to join the short-range network and a device frequency hopper configured to switch the personal protective equipment device to the open frequency.

21 Claims, 12 Drawing Sheets

(51) Int. Cl.
    *H04B 5/72*     (2024.01)
    *H04W 16/14*     (2009.01)
    *H04W 84/18*     (2009.01)

(52) U.S. Cl.
    CPC ..... *H04B 2001/7154* (2013.01); *H04W 84/18* (2013.01)

(58) Field of Classification Search
    USPC ................................................ 455/41.1, 41.2
    See application file for complete search history.

(56) References Cited

U.S. PATENT DOCUMENTS

| | | | |
|---|---|---|---|
| 11,082,859 B2* | 8/2021 | Dzierwa | ................ G06N 5/022 |
| 11,140,648 B2* | 10/2021 | Dzierwa | .............. H04B 17/373 |
| 2009/0310583 A1* | 12/2009 | Suzuki | ................... H04K 3/822 |
| | | | 455/552.1 |
| 2013/0242840 A1* | 9/2013 | Tolhuizen | ......... H04W 52/0209 |
| | | | 370/311 |
| 2017/0063143 A1* | 3/2017 | Hoarau | .................... A41F 9/002 |
| 2017/0245204 A1 | 8/2017 | Kumar | |
| 2018/0076668 A1* | 3/2018 | Parimi | .................... H02J 50/40 |
| 2019/0174239 A1 | 6/2019 | Niklaus et al. | |
| 2019/0246341 A1* | 8/2019 | Dong | ................... H04B 17/318 |
| 2020/0137684 A1* | 4/2020 | Mattela | ............ H04W 52/0225 |
| 2020/0276371 A1* | 9/2020 | Hansen | ................. A61M 60/20 |
| 2021/0127352 A1* | 4/2021 | Agrawal | ............. H04R 1/1041 |

FOREIGN PATENT DOCUMENTS

| | | | | |
|---|---|---|---|---|
| KR | 100767332 B1 | 10/2007 | | |
| KR | 100862353 B1 | 10/2008 | | |
| KR | 101862392 B1 | 7/2018 | | |
| WO | WO-2015062693 A1 * | 5/2015 | ............. | H04W 4/08 |
| WO | 2021064658 A1 | 4/2021 | | |
| WO | 2021171143 A1 | 9/2021 | | |
| WO | 2021181196 A1 | 9/2021 | | |

* cited by examiner

| frame assignments | #0 | #1 | #2 | #3 | #4 | #5 | #6 | #7 | #8 | #9 | #10 | #11 | #12 | #13 | #14 | #15 | #16 | #17 | #18 | #19 | #20 | #21 | #22 | #23 | #24 | #25 |
|---|---|---|---|---|---|---|---|---|---|---|---|---|---|---|---|---|---|---|---|---|---|---|---|---|---|---|
| Initial superframe template | | | | | | | | | | | | | | | | c | | | | | | | | | | |
| audio 16kHz Template 0 | | a | | | | | a | | | | | a | | | | | a | | | | | a | | | | |
| audio 16kHz Template 1 | | | a | | | | | a | | | | | a | | | | | a | | | | | a | | | |
| audio 16kHz Template 2 | | | | a | | | | | a | | | | | a | | | | | a | | | | | a | | |
| audio 16kHz Template 3 | | | | | a | | | | | a | | | | | a | | | | | a | | | | | a | |
| dataCombinedFour16kHzAudio | | | | | | d | | | | | | | | | | | | | | d | | | | | | |
| idleRssiTemplate | | | | | | | | | | r | | | | | | | | | | | | | | | | r |
| o free slots | | | | | | | | | | | | | | | | | | | | | | | | | | |
| 76 assigned slots | X | X | X | X | X | X | X | X | X | X | X | X | X | X | X | X | X | X | X | X | X | X | X | X | X | X |

FIG. 8A

PERSONAL PROTECTIVE EQUIPMENT COMMUNICATION SYSTEMS AND METHODS

CROSS REFERENCE TO RELATED APPLICATIONS

This application is a national stage filing under 35 U.S.C. 371 of PCT/IB2021/051690, filed Mar. 1, 2021, which claims the benefit of U.S. Provisional Application No. 62/986,956, filed Mar. 9, 2020, the disclosure of which is incorporated by reference in its/their entirety herein.

BACKGROUND

Articles of personal protective equipment (PPE) are worn by workers in need of protection from dangerous environment or working conditions. Some examples include hearing protection equipment, fall protection equipment, respirators, face masks and gloves. Many PPE include communication components that can transmit audio or data signals through wired or wireless connections.

SUMMARY

A short-range communication system is presented that includes a system control unit and a personal protective equipment device. The system control unit includes a network creator configured to create a short-range network on a wireless frequency, an interference detector configured to detect a device on an interfering frequency, and a control unit frequency hopper configured to, based on the detected device, scan a frequency range for an open frequency and switch the system control network to the open frequency. The personal protective equipment device includes a network joiner configured to join the short-range network and a device frequency hopper configured to switch the personal protective equipment device to the open frequency.

The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

DETAILED DESCRIPTION

Figure 1:
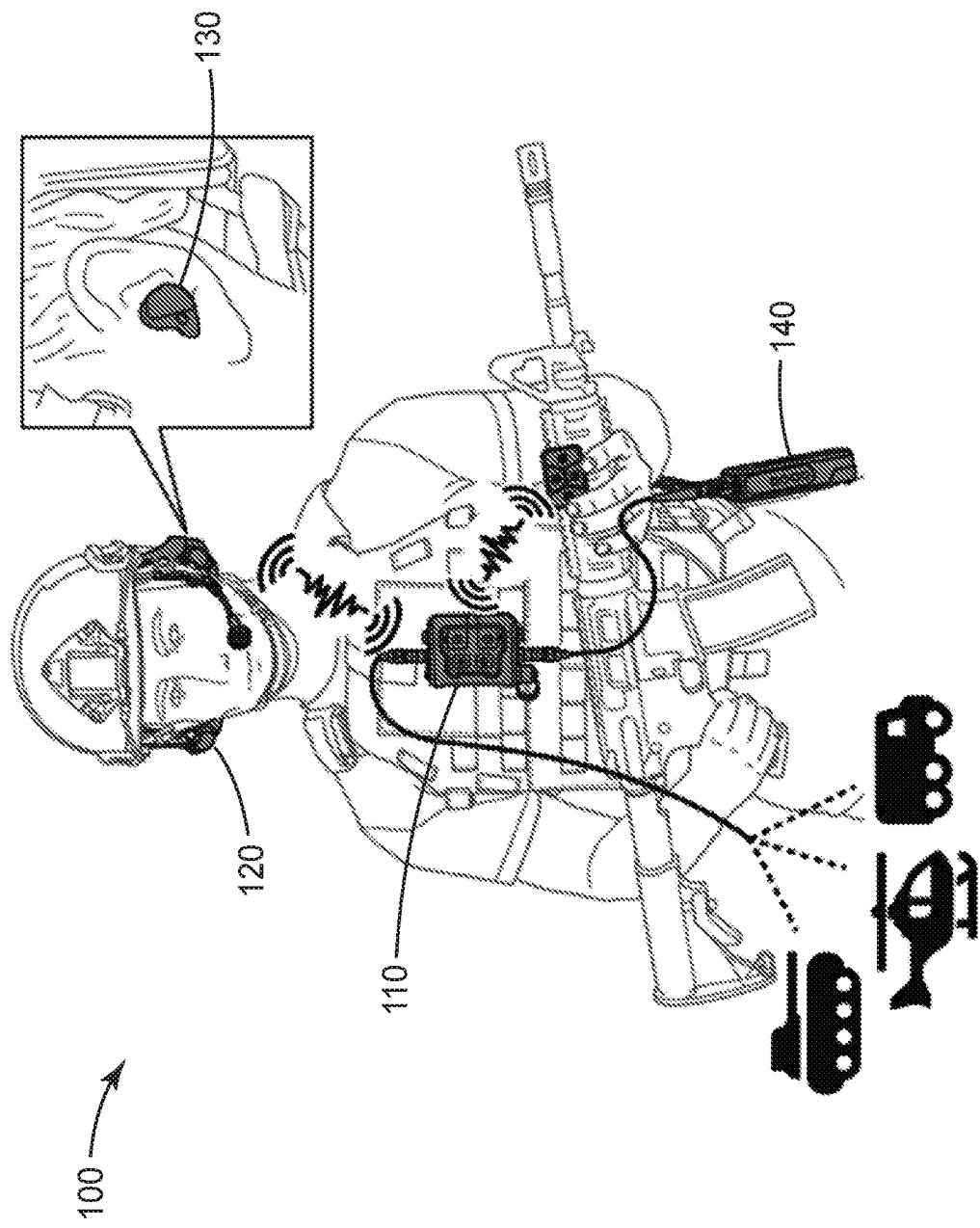
FIG. 1 illustrates a worker with multiple PPE devices in a personal area network.

PPE growing more complex as more functionality is developed and made available. It is becoming a frequent use case that a worker, or other PPE-wearing individual, requires several PPE devices that are worn simultaneously. Often, each PPE device can receive or transmit incoming signals and process either audio, environmental or other sensory data. Many use cases include a control unit that receives incoming signals, sent by other individuals, for example, and transmits outgoing signals.

The control unit is also responsible for facilitating communication between PPE devices worn by a user. The control unit is typically responsible for generating a network which each PPE can join. Often, the network is a Near-Field Magnetic Induction (NFMI) network. NFMI is a short range, digital, wireless physical layer that facilitates communication with a low-power, non-propagating magnetic field between devices. NFMI technology allows for a control unit to form a shorter-range network, often with a range of less than 2 meters, that each PPE device associated with an individual can join. However, while NFMI is one example of a network protocol that can be used for a personal area network (PAN), other wireless protocols may also be suitable.

However, it is noted that widening a range of available frequencies may require a longer antenna. Additionally, while a 2 meter range is illustrative of current NFMI technology, once the hardware of a PPE Device is fixed, the range can be configured further in the software from the maximum possible range of the antenna to a desired range. For example, the range may be about 1 meter, or about 70 centimeters, or about 50 centimeters, or about 20 centimeters. Product constraints may reduce the range further when multiple PPE devices are connected. For example, product constraints of a system control unit, headset and earpiece may reduce the range to about 20 cm.

As a brief explanation of how NFMI technology is used to create a PAN, the control unit creates a network using a frequency in the NFMI range of 3-15 MHz. NFMI enabled PPE devices can then join the NFMI network and, once joined, can communicate with the control unit and, through the control unit, with each other. However, a functional range of the system control unit may be less than the entire NFMI range. The operational range may be shorter depending on operational constraints of one or more devices in the personal area network. The higher end of the NFMI range may be more suitable for PAN systems as lower frequencies require larger antennas. The range may be between 8-15 MHz, 9-15 MHz, 10-15 MHz, 10-14 MHz, 10-13 MHz, 9-13 MHz, 9-14 MHz, or any other suitable range.

Using NFMI for a personal area network is a convenient option for device-to-device communication, and is often a good solution for individual workers. However, because NFMI can extend to a range of 2 meters, when two individuals, each having a PAN operating on the same NFMI frequency, are near to each other, interference can occur.

Solutions described herein allow for a masterless system of control units, each associated with a worker, and each capable of detecting another control unit is near and operating on a frequency likely to cause interference is near. Upon detecting a potential for intersystem interference, the control system closes down the network, switches to a different, open, NFMI frequency and recreates the network. The PPE devices associated with the switching control unit are able to 'follow' the switching control unit to the new frequency and join a newly created network on the new frequency. Ideally, this process happens quickly and automatically so that a worker associated with the control system does not experience a significant disruption in device functionality.

FIG. 1 illustrates a worker with multiple PPE devices in a personal area network. A worker 100 is wearing a control unit 110 that, as illustrated in FIG. 1, may be connected to a communications unit 140 through a wired connection. Control unit 110 is also in wireless communication with in-ear hearing protection devices 130 and over-ear hearing protection device 120. In one embodiment, the wireless communication is achieved using an NFMI protocol. While a wired connection is illustrated in FIG. between control unit 110 and communications unit 140, it is expressly contemplated that a wireless communication link is also possible. Wireless communication with PPE devices, particularly those worn on or around the head of a worker 100 may be preferred as the cable required for a wired connection can cause audio interference, physical interference with an ability of worker 100 to move freely, and adds weight that may pull on a user's ear or head.

One use case where multiple hearing protection devices are useful, and where control by a control unit 110 is helpful, is the case of dual hearing protection illustrated in FIG. 1, and described in greater detail in U.S. Provisional patent application with Ser. No. 62/909,989, filed on Oct. 3, 2019, and incorporated by reference herein. Both in-ear hearing protection device 130 and over-ear hearing protection device 120 are active hearing protection devices, in one embodiment. Active hearing protection devices use electronic circuitry to pick up ambient sound through the microphone and convert them to safe levels before playing it back to the user through a speaker. Additionally, active hearing protection may comprise filtering or cancelling of undesired sound content, for example actively reducing the sound of a gunshot while providing human speech at substantially unchanged levels. Active hearing protection can include in-ear protection as well as over-ear protection.

Some active hearing protection units are level dependent, such that an electronic circuit adapts the sound pressure level for a user. Level dependent hearing protection units help to filter out impulse noises, such as gunshots from surrounding noises, and/or continuously adapt all ambient sound received to an appropriate level before it is reproduced to a user. Active hearing protection units, specifically level dependent active hearing protection units, may be necessary to facilitate communication in noisy environments, or environments where noise levels can vary significantly, or where high impulse sounds may cause hearing damage. A user may need to hear nearby ambient sounds, such as machine sounds or speech, while also being protected from harmful noise levels. Active hearing protection can also be used to increase environmental awareness by amplifying soft sounds.

Figure 2:
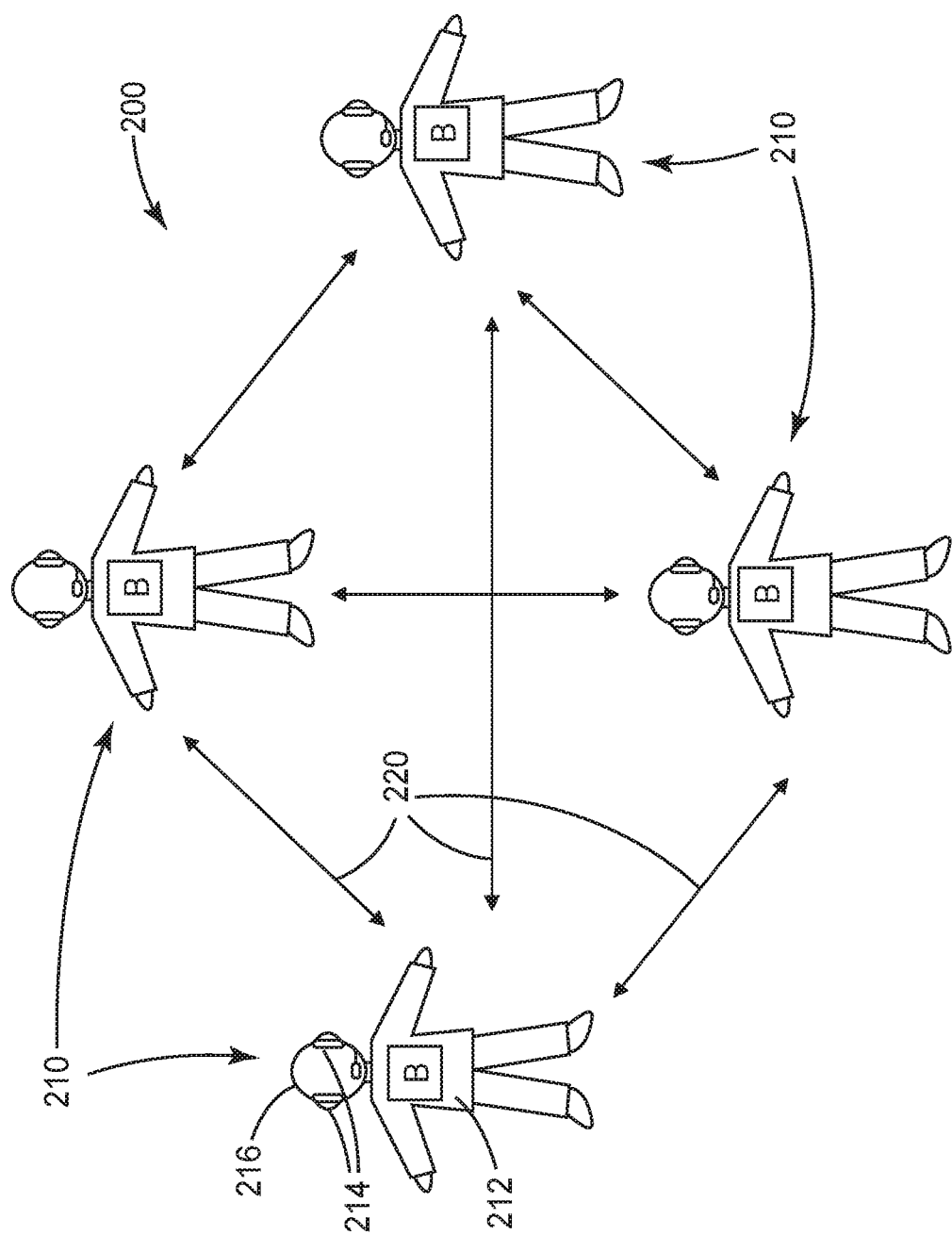
FIG. 2 illustrates a plurality of workers, each with a personal area network in accordance with embodiments herein.

FIG. 2 illustrates a plurality of workers, each with a personal area network in accordance with embodiments herein. Environment 200 may require that a plurality of workers 210 draw near enough to each other to cause interference between the personal area networks of each worker 210. Wireless communication between a control unit 212 and each hearing protection device 214 (in-ear hearing protection devices, for example) and 216 (over-ear hearing protection device, for example). Communication between control unit 212 and hearing protection devices 214, 216 works well when one system is in isolation, as illustrated in FIG. 1. However, when multiple control units 212, each operating a personal area network on the same or similar frequency, significant interference occurs and the control units 212 experienced loss of communication for noticeable amounts of time.

A solution is needed such that allows for individual control units to switch off of a common frequency, when the commonality is detected, to automatically and dynamically minimize interruption of an experience for worker 210. Each control unit 212 should be capable of switching to a new frequency, such that a master control unit in a group of control units 212 does not have to be designated, as designating a master can introduce additional delays.

One solution, discussed in greater detail herein, is to assign each control unit with a communication channel to use for each personal area network. If each control unit communicates to its paired devices on a different frequency, then the personal area networks will not interfere with each other. This will allow multiple workers to work proximate each other without interference or interruption of device functionality.

While the frequency range of 3-15 MHz is a functional range for NFMI technology, it may be desired to use a range around 10.6 MHz, in some embodiments, because that frequency is globally allocated. Additionally, it is noted that, because higher frequencies have a lower wavelength, they are more suitable for shorter ranges, which provides better privacy for a user. In applications where privacy is not a concern, lower frequencies may also be suitable.

In one embodiment, multiple frequencies around the 10.6 nominal are identified, such that each control unit, upon detecting that a nearby control unit is using a similar enough frequency to cause interference, can search for and then switch to another available frequency. It may be desired to space preset frequencies as far apart as reasonable, given an operational range, to reduce overlap and potential for interferences. However, as the spacing is increased, the antenna gains are lower at the higher/lower limits of the hop frequencies.

In one embodiment, the frequency spacing are only adjustable in discrete increments, based on the constraints of the NFMI chip. For example, the frequency spacing may be in multiples of 149 kHz. For example, the frequency spacing may be 149 kHz between preset frequencies, or 298 kHz between frequencies, or 447 kHz between frequencies, or 596 kHz between frequencies, etc.

As discussed in greater detail below, in Example 1, four different frequencies were selected such that Channel 1 was on 10 MHz, Channel 2 was on 10.6 MHz, Channel 3 was on 11 MHz, and Channel 4 was on 11.7 MHz. Looking to FIG. 2, an example scenario could be the following. However, FIG. 2 is illustrated expressly for the purpose of understanding functionality of systems and methods herein and is not intended to be a limiting example.

Worker 210 "A" is operating on Channel 1 when worker 210 "B" approaches. The control unit associated with worker "A" detects that a control unit of worker "B" is also utilizing Channel 1. As soon as the control unit of worker "A" detects the likelihood of interference, it scans known available frequencies to find an open frequency.

In one embodiment, scanning includes checking known available channels, by first noting that Channel 1 is occupied, then checking Channel 2, then Channel 3, and then Channel 4. However, in another embodiment, control unit 212 is aware of a minimum distance required between frequencies of nearby NMFI networks and checks accordingly within an acceptable range. For example, knowing that 10 MHz is in use, control unit may scan by about 0.05 MHz, or about 0.1 MHz, or about 0.2 MHz, until an open frequency that will not cause interference is found. For example, starting at 10 MHz, control unit "A" may scan up to 15 MHz and, if no channel is found, start again at 3 MHz and scan increasing frequencies until a channel is found.

Seeing that Channel 2 is unoccupied, the control unit of worker "A" switches operation to Channel 2 and initializes a new network. PPE associated with worker A, namely hearing devices 214 and 216, will detect the lost connection with their control unit 212. Once the connection is lost, PPE devices will search for the control unit "A", in one embodiment by similarly scanning frequencies until control unit "A" is found. In another embodiment, once control unit "A" detects an open channel, it sends an instruction to PPE 214, 216 to 'follow' the control unit to the new frequency. Once the PPE are operating on the same frequency, control unit A will join them to the new network, and operation will continue. In some embodiments, the transition occurs quickly enough that worker 210 is substantially unimpacted. For example, the process may take less than about 1 second. It is desired, in embodiments herein, to reduce the dropout time, so that workers. 210 are not impacted. It may be possible to reduce the switching process time by better coordinating transitioning of both the network creator (control unit 212) and network joiners (PPE devices 214, 216). The switching time may be reduced to about 0.9 seconds, or about 0.8 seconds, or about 0.7 seconds, or about 0.6 seconds, or about 0.5 seconds, or about 0.4 seconds, or about 0.3 seconds.

Now, Worker A has a PAN operating on Channel 2 and Worker B has a PAN operating on Channel 1. Worker C may approach at this time, also operating on Channel 1. Worker C's control unit 212 may detect the potential interference first and start searching for an open channel, as described above. Since Channel 2 is occupied by Worker A's control unit, Worker C's control unit continues searching and finds Channel 3 open. Worker C's control unit switches to Channel 3 and, when associated PPE 214, 216 also transitions to Channel 3, rejoins the PPE to the new network.

Similarly, if Worker D now approaches Workers A, B and C, also on Channel 1, Worker B's control unit may be the first to detect a potential interference. As Worker B's control unit was first to detect the potential interference, it then searches for a new open channel. Finding Channel 2 occupied by Worker A, and Channel 3 occupied by Worker C, Worker B's control unit continues searching and finds Channel 4 open, and initiates a switch and initializes a network on Channel 4. Once Worker B's PPE devices also switch, the control unit rejoins them to the network and continues operation as before.

This allows for all four control units to, in a masterless system, seamlessly detect a potential interference and switch to an open frequency automatically, without substantial interference to Workers' 210 experience. However, while four control units are illustrated in the system of FIG. 2, it is expressly contemplated that additional control units can be added until all frequencies in the wireless frequency range are either occupied or would cause interference with an occupied frequency.

As described with respect to FIG. 2, in some embodiments the first control unit to detect a potential interference initiates a channel switch. However, in other embodiments, the first device to detect a potential interference could, instead of switching automatically, send a communication that the other device must switch. In some embodiments, a confirmation of change may be sent so that both devices do not initiate a channel switch simultaneously.

FIG. 2 also illustrates internetwork communications 220, which transfer data or speech between workers 210. Communication 220, between control units 212, may include audio transmissions such as speech captured from workers 210, and may be transmitted using any suitable wireless protocol such as cellular, 2G, 3G, 4G, 5G, Bluetooth®, WiFi, Zigbee or any other suitable protocol.

Figure 3:
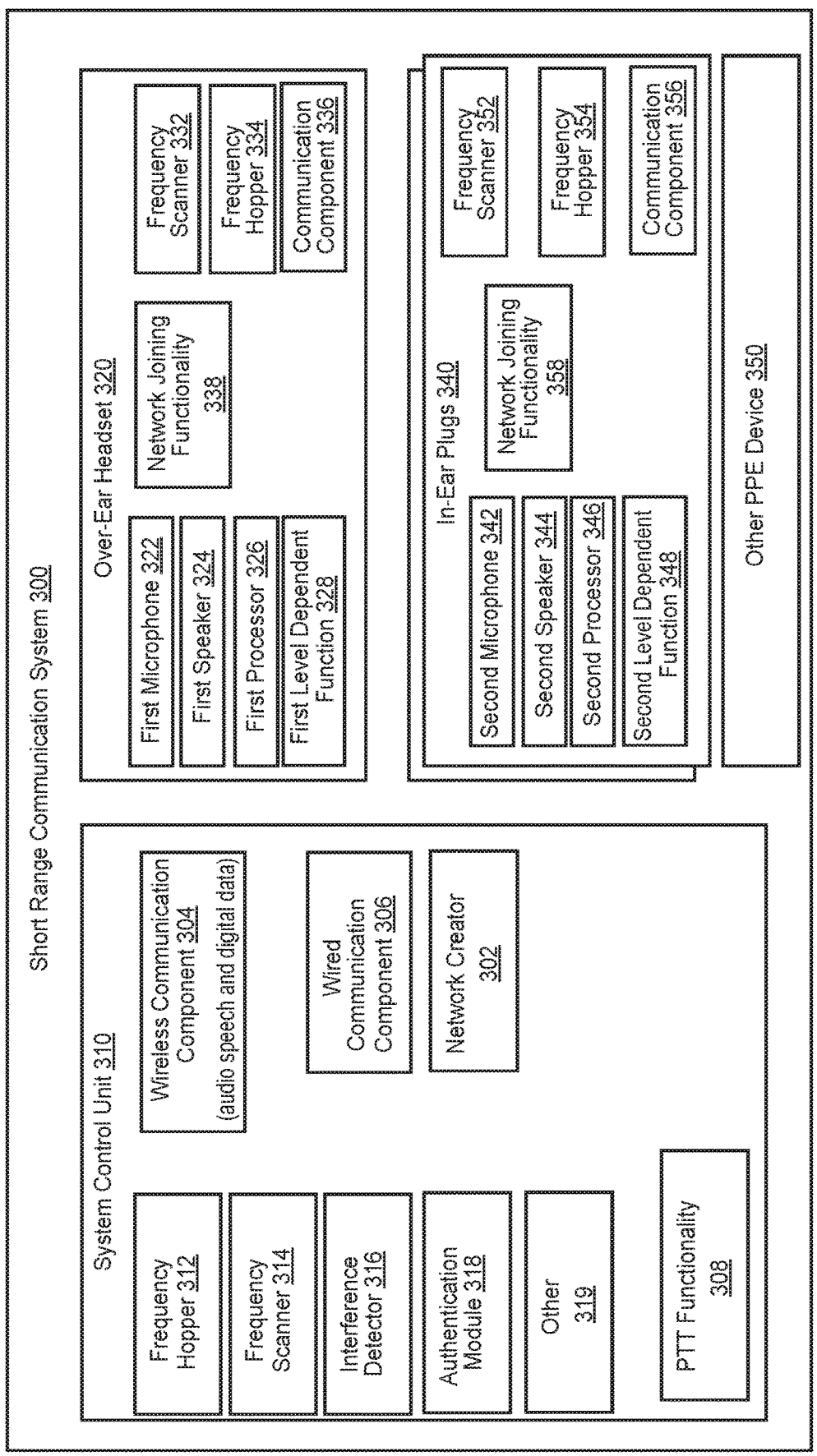
FIG. 3 illustrates a short-range communication system in accordance with embodiments herein.

FIG. 3 illustrates a short-range communication system in accordance with embodiments herein. system 300 includes devices associated with a single worker. System 300 is illustrated as including an over-ear headset 320 and an in-ear headset 340 controlled by a system control unit 310. However, this is for the sake of understanding only. It is expressly contemplated that other PPE devices 350 may connect to a network created by system control unit 310 either in addition to hearing protection devices 320 and 340, or instead of. Such other PPE devices 350 may operate similarly to hearing protection devices 320, 340 described herein.

System control unit 310 includes a network creator 302 which creates a short-range wireless network using a suitable wireless protocol, such as NFMI. System control unit 310 may connect to some devices using a wired communication component 306, and may connect to others using wireless communication component 304. Wireless communication component 304 may be preferred for transmitting audio and digital data in order to retain quality. System control unit 310 may also facilitate Push-to-Talk, or Push-to-Talk Over Cellular functionality, as described, for example, in U.S. Provisional patent application with Ser. No. 62/981,057, filed on Feb. 25, 2020.

System control unit 310 is a master device that creates a network 302 and joins available PPE devices to the network. PPE devices, such as over-ear headset 320 and in-ear headset 340. PPE devices may go through an authentication process by authentication module 318 before being admitted to a network, either initially or after each frequency hop.

Interference detector 316 may detect a potential interference, for example from another short-range communication system nearby. A potential interference may include the other short-range communication system being on the identical frequency set up by control unit 310, or a frequency close enough that interference is possible or likely. Potential interference can be detected, in one embodiment, by detecting energy on the frequency. However, using only energy detection may result in false positives. In one embodiment, interference detector 316 may only initiate a frequency hop if a valid time-division multiple access (TMDA) frame is detected.

Once a potential interference is detected by interference detector 316, system control unit 310 may activate a frequency scanner 314 to detect an open frequency that system control unit 310 can jump to. While, in some embodiments, frequency scanner 314 is constantly checking and caching information about frequencies that are open or in use, this may be battery intensive. Therefore, in some embodiments, frequency scanner 314 is not activated until after interference detector 316 detects a potential or actual interference.

Once an open frequency is found, frequency hopper 312 will switch system control unit 310 to the open frequency. An open frequency is defined as a frequency with no other active system control unit. An open frequency may be selected by frequency scanner 314 scanning a plurality of preset channels for an open channel. Alternatively, frequency scanning may operate similar to a car radio conducting a scanning operation for a next radio station, stepping through the NFMI frequency band until an open frequency is found that is a suitable distance from any occupied frequency to cause interference.

In some embodiments, once a suitable frequency is found, and before system control unit 310 transitions to the new frequency, it transmits a communication to PPE devices 320, 340, 350 indicating the new frequency. In other embodiments, system control unit jumps to the new frequency without communicating to other paired devices within the network.

When system control unit 310 jumps to the new frequency, it creates a new network on the new frequency, using network creator.

System control unit 310 may have other functionality 319 necessary to accomplish the tasks described or to otherwise facilitate functionality and communication between PPE devices 320, 340, 350 and between wearers of short-range communication systems 300.

Over-ear headset 320 and in-ear headset 340 may have some shared functionality. Each may have a communication component 336, 356 that communicates with system control unit 310 either to receive data or audio from system control unit 310 (which may receive it from a remote source, such as another system control unit 310 associated with another short range communication system 300) and provide it to a user through either first speaker 324 or second speaker 344. Additionally, each of over-the-ear headset 320 and in-ear headset 340 can pick up speech or other audio from a wearer through first microphone 322 or second microphone 342.

Over-the-ear headset 320 and in-ear headset 340 may be active hearing protection devices, and each may have a processor 324, 344 capable of processing received sound to a safe level. The sound may be proceed using a level dependent function 328, 348. The received sound may be received from system control unit 310 or from an ambient source. In one embodiment, over-ear hearing protection system 320 and in-ear hearing protection system 340 can operate in a dual-hearing protection mode in response to a command from system control unit 310.

When system control unit 310 jumps to a new frequency, each device 320, 340, and 350 will detect that the system control unit 310 is no longer available. This may be done by detecting a timeout in communication, detecting that a network has failed, or any other suitable method. For example, each of devices 320, 340 and 350 get a device gone event when they lose the system control unit 310.

When PPE devices 320, 340, 350 lose contact with system control unit 310, or in response to a communication indicating that system control unit 310 is changing to another frequency, PPE devices 320, 340 and 350 will seek to rejoin a network with system control unit 310. Over-ear headset 320 and in-ear plugs 340 may both have frequency scanners 332, 352 that search for a frequency occupied by system control unit 310. Once the frequency is located, frequency hoppers 334, 354 switch operation PPE units 320, 340 to the new frequency, and network joining functionality 338, 358 undergo a new joining process with system control unit 310. Authentication by authentication module 318 may be part of the re-joining process. However, in other embodiments, system control unit 310 recognizes the previously paired devices 320, 340 and allows them to join the network without re-authentication.

Figure 4:
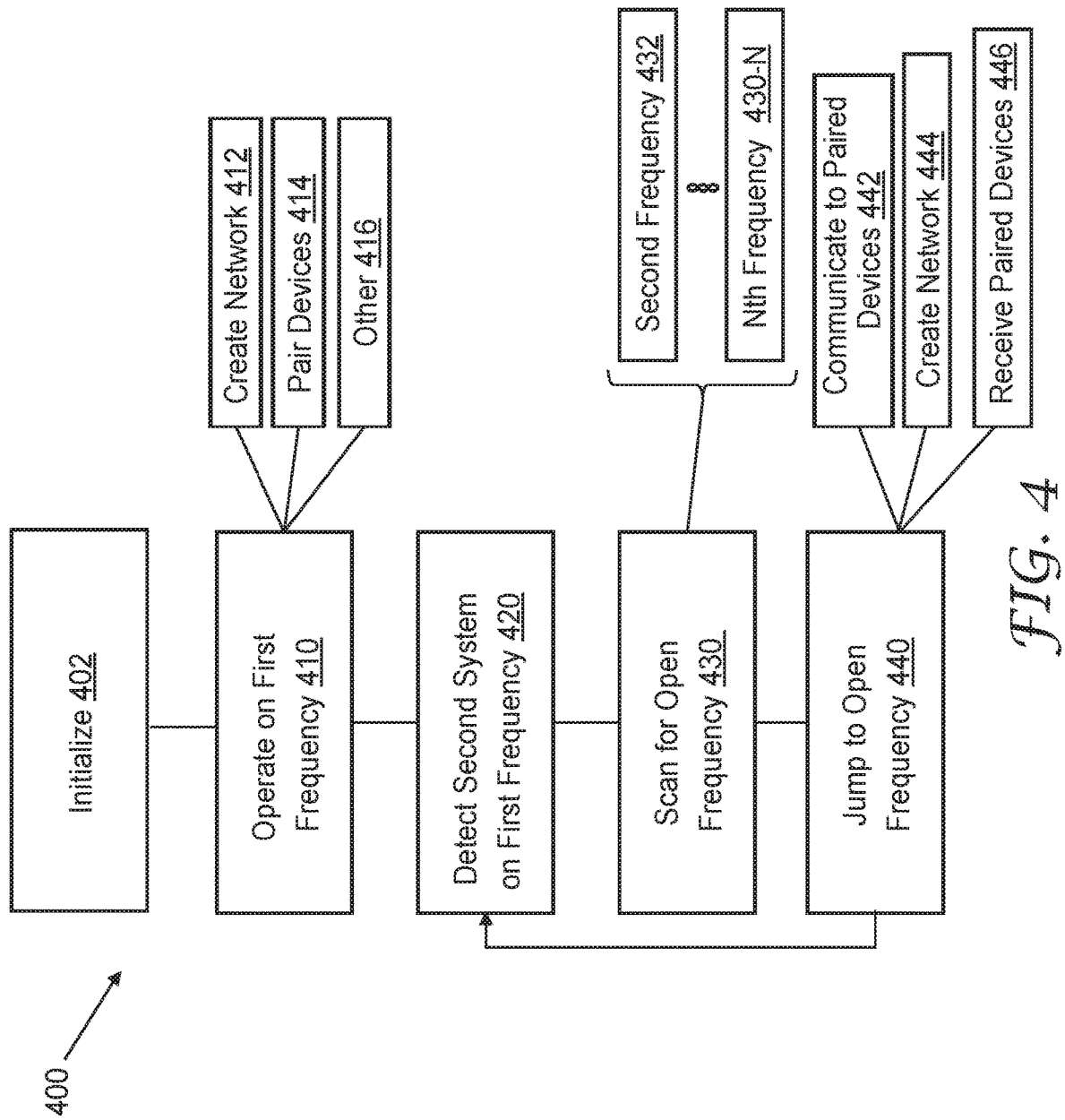
FIG. 4 illustrates an example method of switching to an open frequency in accordance with embodiments herein.

FIG. 4 illustrates an example method of switching to an open frequency in accordance with embodiments herein. Method 400 may illustrate a method of automatically detecting an interference and transferring to an open frequency from the perspective of a control unit responsible for creating and joining PPE devices to a network. In one embodiment, initially the creator side algorithm is in a searching state where a frequency is chosen by the creator device, such as the system control unit 310 of FIG. 3. However, while reference may be made to FIG. 3 in explaining the functions described with respect to FIGS. 4-5, it is expressly contemplated that other creator devices may practice method is 400 and 500.

In block 402, the system is initialized. In one embodiment, the control unit is in a carrier detect mode during normal operation such that it periodically searches for other carriers on a similar frequency. If another carrier is detected, the control unit scans for valid frames until a configurable timeout. In one embodiment, the timeout is one super frame, or approximately 37 milliseconds. However, other suitable timeout periods may be possible. If a valid frame is detected, a carrier detected flag is set, indicating that a second control unit, with a second network, is in the vicinity. If no device is detected, then the control unit switches from a searching state to a created state. The advantage of a shorter time outs is that one can hop through frequencies quickly, resulting in quick reconnection times. However, a disadvantage with too small timeouts is that the device can miss the frames as not all the slots in the superframe are occupied. The exact value of a timeout can vary with the superframe template. The timeout may be as short as about 10 ms, or about 15 ms, or about 20 ms, or about 25 ms, or about 30 ms, or about 35 ms, or about 40 ms. In one embodiment, the timeout value is 37 ms.

In block 410, the control unit operates on a first frequency. Operating on a first frequency may include the control unit creating a network, as indicated in block 412. It may also include pairing one or more PPE devices, as indicated in block 414, to the control unit through a network. Pairing may include an authentication process. Authentication may include identifying the one or more PPE devices, either the type of PPE, the brand, the model or any other information suitable for operating a short-range communication network of PPE devices. Operating on the first frequency may also include other functionality of the control unit, as indicated in block 416.

In block 420, a second system is detected on a frequency that causes interference. Detecting interference may include detecting that a threshold has been reached. The threshold may be a configurable RSSI threshold, for example, or a sync delta threshold.

In block 430, once an interference state is detected, the control unit searches for a new frequency to switch to in order to reduce interference. Scanning for a new frequency may comprise a similar operation to that described in the initialization step, namely entering a carrier detect mode, where it scans subsequent frequencies until an open one is found. In some embodiments, scanning includes moving sequentially from one frequency to another, pausing on each to detect either another device or a timeout indicative of an open frequency. Scanning may include scanning a known, preset number of frequencies, starting with a second frequency 432 and proceeding to a 430-N frequency. In another embodiment, scanning includes proceeding through a frequency range by stepping through the range by a predetermined amount, such as about 0.7 MHz, or about 0.6 MHz, or about 0.5 MHz, or about 0.4 MHz, or about 0.3 MHz, or about 0.2 MHz, or about 0.1 MHz, or about 0.05 MHz.

In block 440, the control unit operates on the second frequency. This may include creating a new network, as indicated in block 444, and receiving devices for pairing to the created network, as indicated in block 446. Jumping to an open frequency may also include communicating a selected new frequency to the paired devices, as indicated in block 442.

Figure 5:
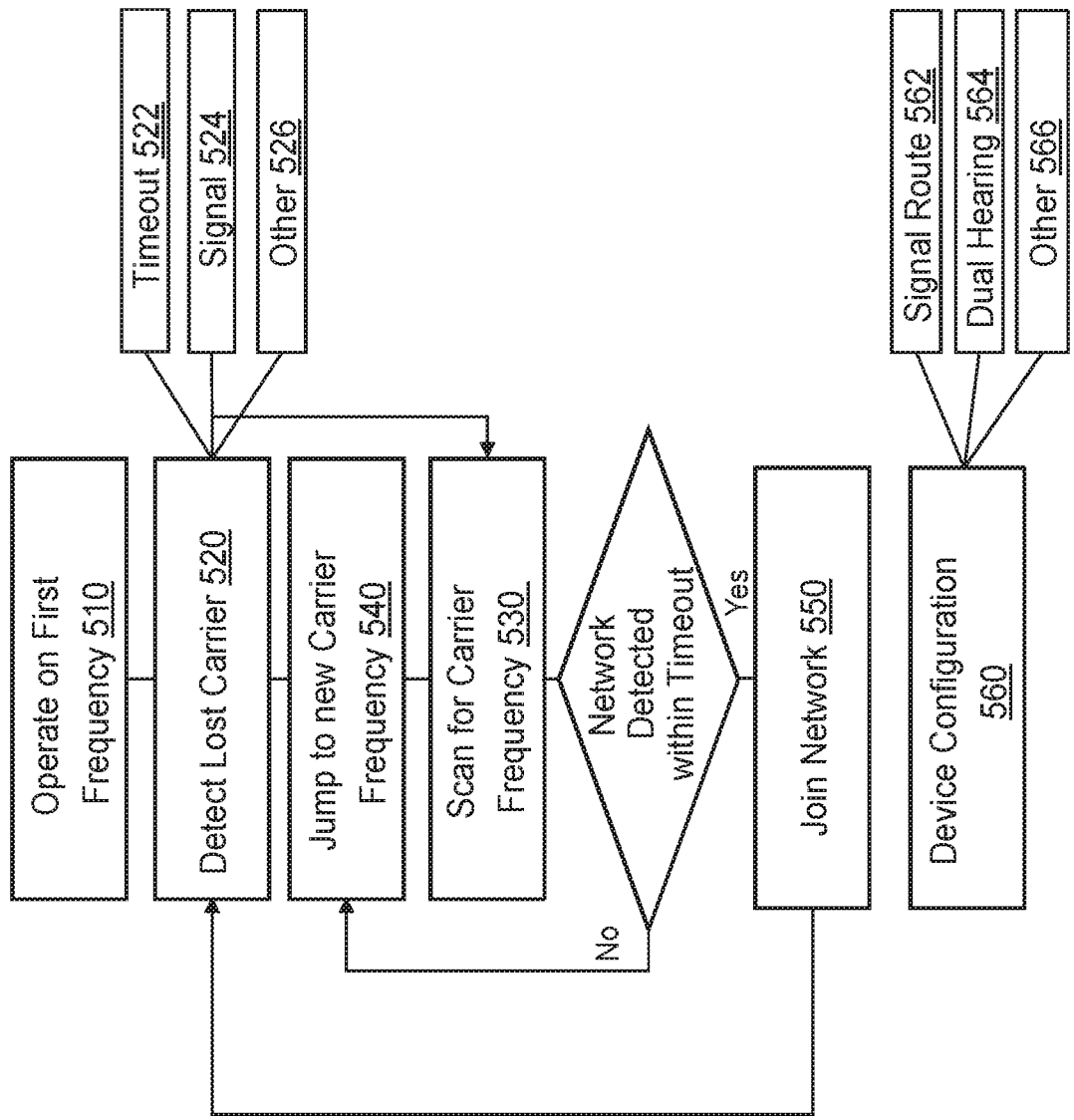
FIG. 5 illustrates an example method of pairing PPE to an open frequency in accordance with embodiments herein.

FIG. 5 illustrates an example method of pairing PPE to an open frequency in accordance with embodiments herein.

Method 500 may reflect operations as viewed from a joining device, such as a PPE device.

In block 510, the PPE device is operating on a network set up on a first wireless frequency. In one embodiment, the network is an NFMI network set up by a control unit on a frequency is the NFMI range. Operating on the first frequency may include sending captured audio, such as speech from a wearer of the PPE, or recorded sensor data, to the control unit for dissemination to a remote source. The PPE device may also receive audio or data signals from the control unit, and either provide them to a wearer of the PPE device, or implement them as a received command or configuration.

In block 520, a lost network is detected. When the control unit switches to a new frequency, the PPE devices will detect that a signal from the control unit has been lost. Detecting that a signal has been lost may include detecting a timeout, as indicated in block 522. Detecting a lost signal may also include receiving a signal from the control unit, as indicated in block 524, indicating that the control unit has detected interference, is searching for a new frequency, or even what frequency the control unit is jumping to. Other suitable detection schemes are also possible, as indicated in block 526.

In block 530, the PPE device switches from a joined to a join state and searches for the control unit. Scanning may include searching for a carrier on a first frequency and, if the carrier is not detected within a configurable timeout range, switching to a second frequency and searching again, continuing through a plurality of frequencies until the carrier is discovered. The frequencies may be predetermined, as described below in the Examples, which may reduce a time taken to re-discover a control unit. For example, both the control unit and the PPE devices may be configured to operate on a lowest available preset frequency and scan (and then switch) to the next lowest available frequency when interference is detected. If both the control unit and the paired PPE devices scan preset frequencies in the same order, it may reduce time needed to repair the PPE devices on the new frequency.

In block 540, the PPE device jumps to a frequency occupied by a carrier to which it was previously paired. As illustrated, this may occur without a scanning step, for example in embodiments where the carrier communicates a frequency to which is switching to any paired PPE. In other embodiments, jumping to a carrier frequency includes jumping to the frequency on which the carrier was detected during the scan.

In block 550, the PPE device joins a network initialized by the control unit on the new frequency. Joining a network may require an authentication step, which may be the same as an initial authentication when the PPE device first joined a network with the control unit, or the authentication may be less stringent if the control unit recognizes the PPE device as a previously paired device.

In block 560, the PPE device enters a device configuration. Device configuration may include preferred signal routing, as indicated in block 562. For example, one PPE may have a better-quality microphone than another PPE and should be a preferred microphone selection. Alternatively, one PPE may be known to interfere with another—for example, presence of a respirator may inhibit a boom microphone from clearly picking up speech and, therefore, a microphone in the respirator should be preferred. Signal routing is discussed in greater detail in U.S. Provisional patent application with Ser. No. 62/986,876, filed on Mar. 9, 2020, which is incorporated by reference herein. Additionally, when two hearing protection devices are detected on a network, the control unit may send a command signal for the two devices to operate in a dual hearing mode, as indicated in block 564. In another embodiment, however, the two hearing protection devices may detect each other and automatically enter a dual hearing protection mode, as described in U.S. patent application with Ser. No. 62/909,989, filed on Oct. 3, 2019, incorporated by reference herein. Other functional commands may also be sent from a control unit to a PPE device, as indicated in block 566.

Figure 6:
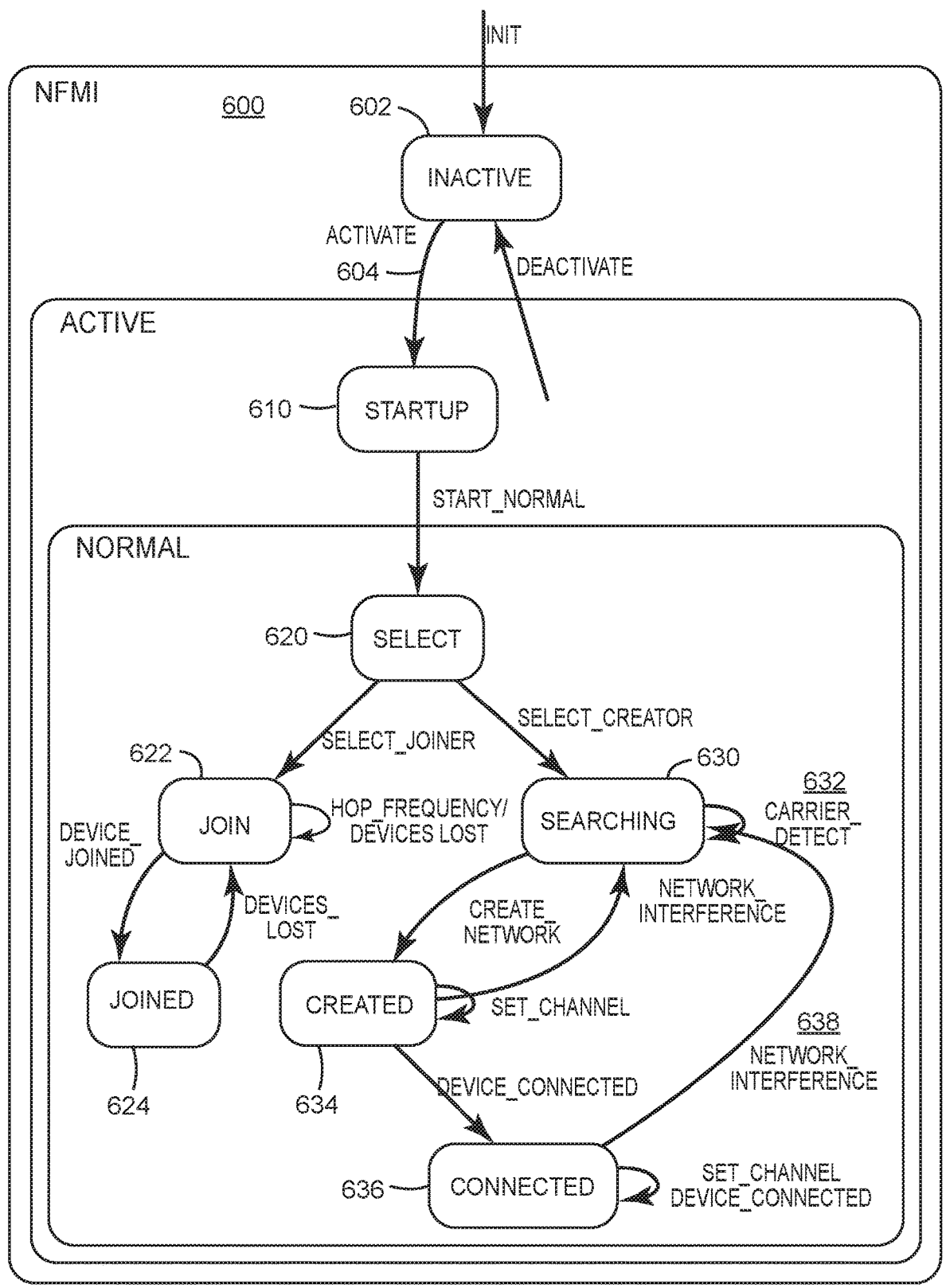
FIG. 6 is an example state diagram for embodiments described herein.

FIG. 6 is an example state diagram for embodiments described herein. State diagram 600 may indicate how PPE devices behave within an NFMI network. As indicated in block 602, a control unit may initially be inactive. It may become activated and move from an inactive state to a startup state 610, as indicated by arrow 604. It may then move into a select mode either directly or through a direct file update 606.

In the select mode 620, the control unit is operating a network on a frequency and may detect PPE devices that want to join the network, as indicated in block 622. The PPE devices may enter a joined state 624 after joining the network. Also as illustrated, PPE devices are configured to hop to a new frequency and join a new network if the control unit switches networks.

In the searching mode 630, which may be entered when a carrier detect algorithm returns a result that another control unit is on a frequency that will potentially cause interference. The control unit searches until it finds a frequency that is open and then creates a network, as indicated by created state 634. Once the control unit creates a network, it will detect the PPE devices when they also switch to the new carrier frequency and enter a connected state 636. As illustrated by arrow 638, the control unit may continue scanning for network interference periodically and, if interference is found, re-enter searching state 630.

A short-range communication system is presented that includes a system control unit and a personal protective equipment device. The system control unit includes a network creator configured to create a short-range network on a wireless frequency, an interference detector configured to detect a device on an interfering frequency, and a control unit frequency hopper configured to, based on the detected device, scan a frequency range for an open frequency and switch the system control network to the open frequency. The personal protective equipment device includes a network joiner configured to join the short-range network and a device frequency hopper configured to switch the personal protective equipment device to the open frequency.

The short-range communication system may be implemented such that the short-range network is a Near Field Magnetic Induction (NFMI) network.

The short-range communication system may be implemented such that the detected device is operating on a substantially identical frequency to the wireless frequency.

The short-range communication system may be implemented such that the detected device is operating on a frequency that is within 0.5 MHz of the wireless frequency.

The short-range communication system may be implemented such that the frequency range is a range from about 3 MHz to about 15 MHz.

The short-range communication system may be implemented such that the frequency range is a range from about 10 MHz to about 13 MHz.

The short-range communication system may be implemented such that scanning the frequency range includes scanning a plurality of preset frequencies within the range.

The short-range communication system may be implemented such that scanning the frequency range includes stepping through the frequency range and scanning each of a series of frequencies within the frequency range.

The short-range communication system may be implemented such that scanning the frequency range includes checking a frequency within the frequency range for an energy reading.

The short-range communication system may be implemented such that the open frequency is a scanned frequency with a substantially zero energy reading.

The short-range communication system may be implemented such that the system control unit also includes an authenticator configured to authenticate the personal protective equipment during a joining operation.

The short-range communication system may be implemented such that the personal protective equipment device is configured to detect that the system control unit has left the wireless frequency. The personal protective equipment device includes has a personal protective equipment frequency scanner that scans the frequency range for the system control unit.

The short-range communication system may be implemented such that the personal protective equipment device is a first personal protective equipment device, and further comprising a second personal protective equipment device.

The short-range communication system may be implemented such that the first and second personal protective equipment devices are hearing protection devices.

The short-range communication system may be implemented such that the first and second personal protection equipment devices operate in a dual hearing mode when both are paired to the system control unit.

The short-range communication system may be implemented such that the system control unit includes push-to-talk functionality.

The short-range communication system may be implemented such that the push-to-talk functionality is push-to-talk over cellular functionality.

The short-range communication system may be implemented such that it further includes a communications unit.

The short-range communication system may be implemented such that the communications unit is coupled to the system control unit through a wired connection.

A method of changing operational frequencies of a short-range communication system is presented. The method includes operating the short-range communication system on a short-range wireless network using a frequency. The method also includes detecting, using an interference detector, a system operating on an interfering frequency. The method also includes scanning, using a frequency scanner, an available frequency range for an open frequency. The method also includes switching, using a frequency hopper, to the open frequency. The method also includes joining a device to a new wireless network on the open frequency. The steps of scanning, switching and joining are done automatically by a system control unit in response to the detected system.

The method may be implemented such that the wireless network is a Near Field Magnetic Induction (NFMI) network.

The method may be implemented such that the interfering frequency is a substantially identical frequency to the frequency.

The method may be implemented such that the interfering frequency is within 0.5 MHz of the frequency.

The method may be implemented such that the available frequency range is a range from about 3 MHz to about 15 MHz.

The method may be implemented such that scanning the available frequency range includes scanning a plurality of preset frequencies within the range.

The method may be implemented such that scanning the available frequency range includes stepping through the available frequency range and scanning each of a series of frequencies within the available frequency range.

The method may be implemented such that scanning the available frequency range includes checking a scanned frequency within the frequency range for an energy reading.

The method may be implemented such that the open frequency is a scanned frequency with a substantially zero energy reading.

The method may be implemented such that it also includes authenticating the device requesting to join a network.

The method may be implemented such that authenticating includes identifying a device type, a device brand, or a device model.

The method may be implemented such that it also includes sending an operational parameter to the device.

The method may be implemented such that it also includes sending a signal to the device indicative of the detected interference.

The method may be implemented such that it also includes sending a signal to the device indicative of the open frequency.

The method may be implemented such that it also includes initializing the new wireless network on the open frequency.

The method may be implemented such that the system is a second short-range communication system.

The method may be implemented such that the device is a personal protective equipment article.

The method may be implemented such that the device is a first device. The method also includes joining a second device to the network.

The method may be implemented such that the first and second devices are both hearing protection devices.

The method may be implemented such that the first and second devices enter dual hearing protection mode when both are joined to the network.

The method may be implemented such that the dual hearing protection mode is entered based on the first and second devices detecting each other on the network.

The method may be implemented such that the dual hearing protection mode is entered based on a signal from the system control unit.

The method may be implemented such that it also includes communicating with the detected system on a wireless protocol other than the short-range wireless network.

The method may be implemented such that communicating includes sending or receiving an audio or data signal using the wireless protocol.

A method of hopping frequencies for a device a short-range communication system is presented. The method includes operating the device in a wireless network on a first frequency. The method also includes detecting that a creator device on the wireless network has left the first frequency. The method also includes jumping, automatically, based on the detected lost creator device, to a new frequency containing the creator device. The method also includes joining, automatically, a network created by the creator device on the new frequency.

The method may be implemented such that it also includes scanning, using a frequency scanner, an available frequency range for the creator device.

The method may be implemented such that the available frequency range is a range from about 3 MHz to about 15 MHz.

The method may be implemented such that scanning the available frequency range includes scanning a plurality of preset frequencies within the range.

The method may be implemented such that scanning the available frequency range includes stepping through the available frequency range and scanning each of a series of frequencies within the available frequency range.

The method may be implemented such that scanning the available frequency range includes checking a scanned frequency for the creator device.

The method may be implemented such that it also includes receiving a configuration instruction from the creator device.

The method may be implemented such that the configuration instruction includes a signal routing instruction.

The method may be implemented such that operating in a wireless network includes sending a captured audio or data signal to the creator device on the first frequency.

The method may be implemented such that operating in a wireless network includes receiving an audio or data signal from the creator device on the first frequency.

The method may be implemented such that detecting that the creator device has left includes any of: a timeout: a received signal indicating an interference: or a received new frequency indication.

The method may be implemented such that the wireless network is a Near Field Magnetic Induction (NFMI) network.

The method may be implemented such that joining the network includes undergoing an authentication procedure.

The method may be implemented such that the creator device is a control unit. The device is a personal protection equipment article.

The method may be implemented such that the device is configured to communicate with a second personal protection equipment article, also joined to the control unit, using the network.

The method may be implemented such that the personal protection equipment article and the second personal protective equipment article are both hearing protection devices, and configured to operate in a dual hearing protection mode when both are joined to the control unit on the network.

A system control unit for a short-range communication system is presented. The system includes a wireless communication component configured to operate using a first wireless communication protocol. The system control unit also includes a wireless communication component configured to operate on a second wireless communication protocol. The second wireless communication protocol is a short-range communication protocol. The system control unit is operating using a first frequency. The system control unit also includes an interference detector configured to detect that a second system using the second wireless communication protocol is operating on a frequency that interferes with the first frequency. The system control unit also includes a frequency scanner that, based on the detected interference, automatically scans a frequency range for the second wireless communication protocol for an open frequency. The system control unit also includes a frequency hopper that changes an operational frequency of the system control unit to the open frequency. The system control unit also includes a network creator that creates a new network on the open frequency.

The system control unit may be implemented such that the network creator joins a device to the network.

The system control unit may be implemented such that the system control unit communicates with the device over the network using the second wireless communication protocol.

The system control unit may be implemented such that the system control unit communicates with the second device using the first wireless communication protocol.

The system control unit may be implemented such that the second system is a second system control unit operating a second network using a second frequency of the second wireless communication protocol.

The system control unit may be implemented such that the second frequency is substantially identical to the first frequency.

The system control unit may be implemented such that the second frequency is within 0.5 MHz of the first frequency.

The system control unit may be implemented such that the first wireless communication protocol is a WIFI, Bluetooth®, Zigbee or cellular communication protocol.

The system control unit may be implemented such that the second wireless communication protocol is an Near Field Magnetic Induction protocol.

The system control unit may be implemented such that short range includes less than 3 meters.

The system control unit may be implemented such that scanning the frequency range includes scanning at least a portion of a range from about 3 MHz to about 15 MHz.

The system control unit may be implemented such that scanning the frequency range includes scanning at least a portion of a range from about 10 MHz to about 13 MHz.

The system control unit may be implemented such that scanning the frequency range includes scanning a plurality of preset frequencies within the range.

The system control unit may be implemented such that scanning the frequency range includes stepping through the frequency range and scanning each of a series of frequencies within the frequency range.

The system control unit may be implemented such that scanning the frequency range includes checking a frequency within the frequency range for an energy reading.

The system control unit may be implemented such that the open frequency is a scanned frequency with a substantially zero energy reading.

The system control unit may be implemented such that the system control unit also includes an authenticator configured to authenticate the device during a joining operation.

The system control unit may be implemented such that the system control unit includes push-to-talk functionality.

The system control unit may be implemented such that the push-to-talk functionality is push-to-talk over cellular functionality.

The system control unit may be implemented such that it also includes a wired communication link to a communications unit.

EXAMPLES

Example 1

Figure 7A:
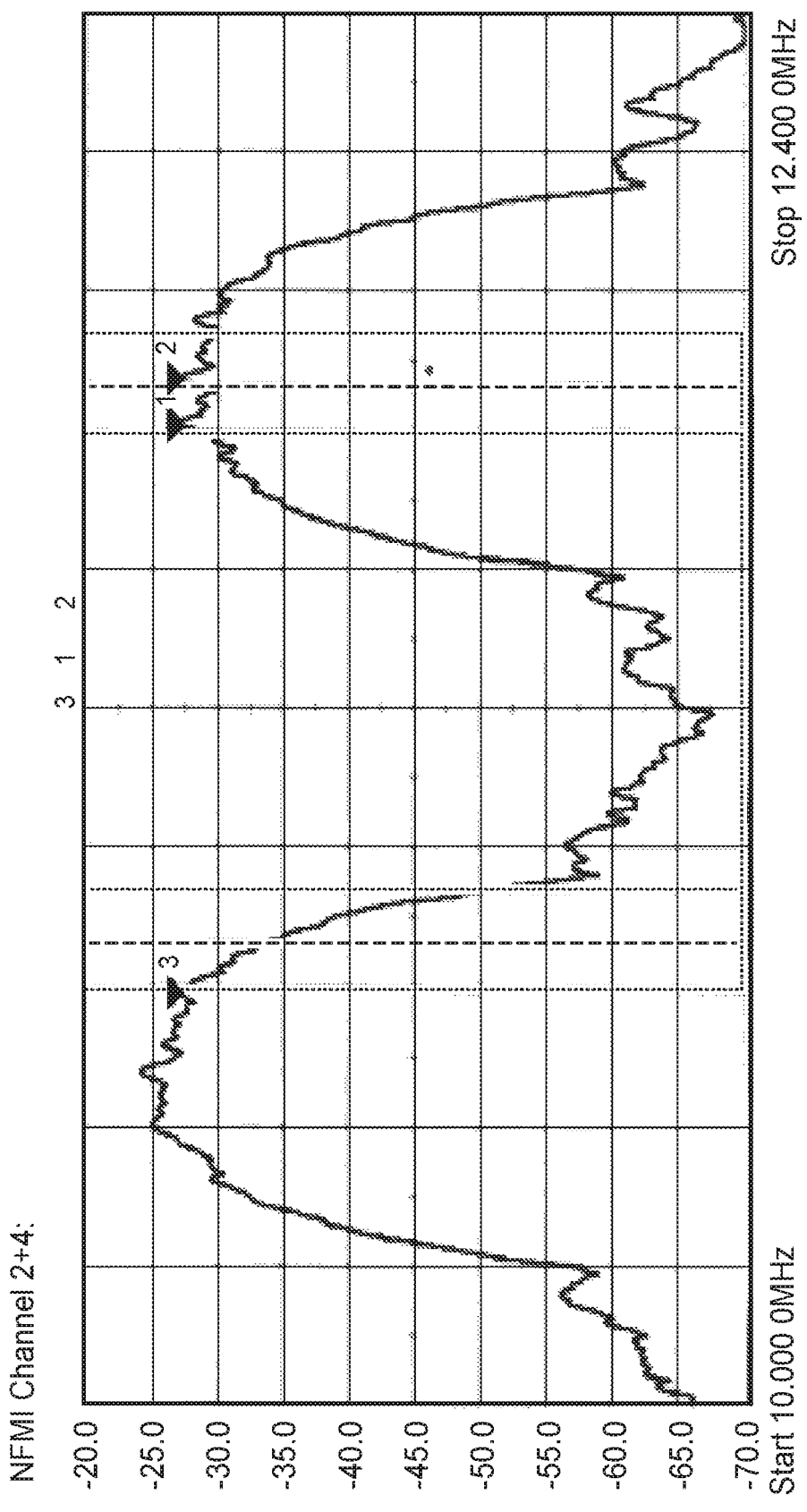
FIGS. 7-8 are discussed in detail in the Examples.
Figure 7B:
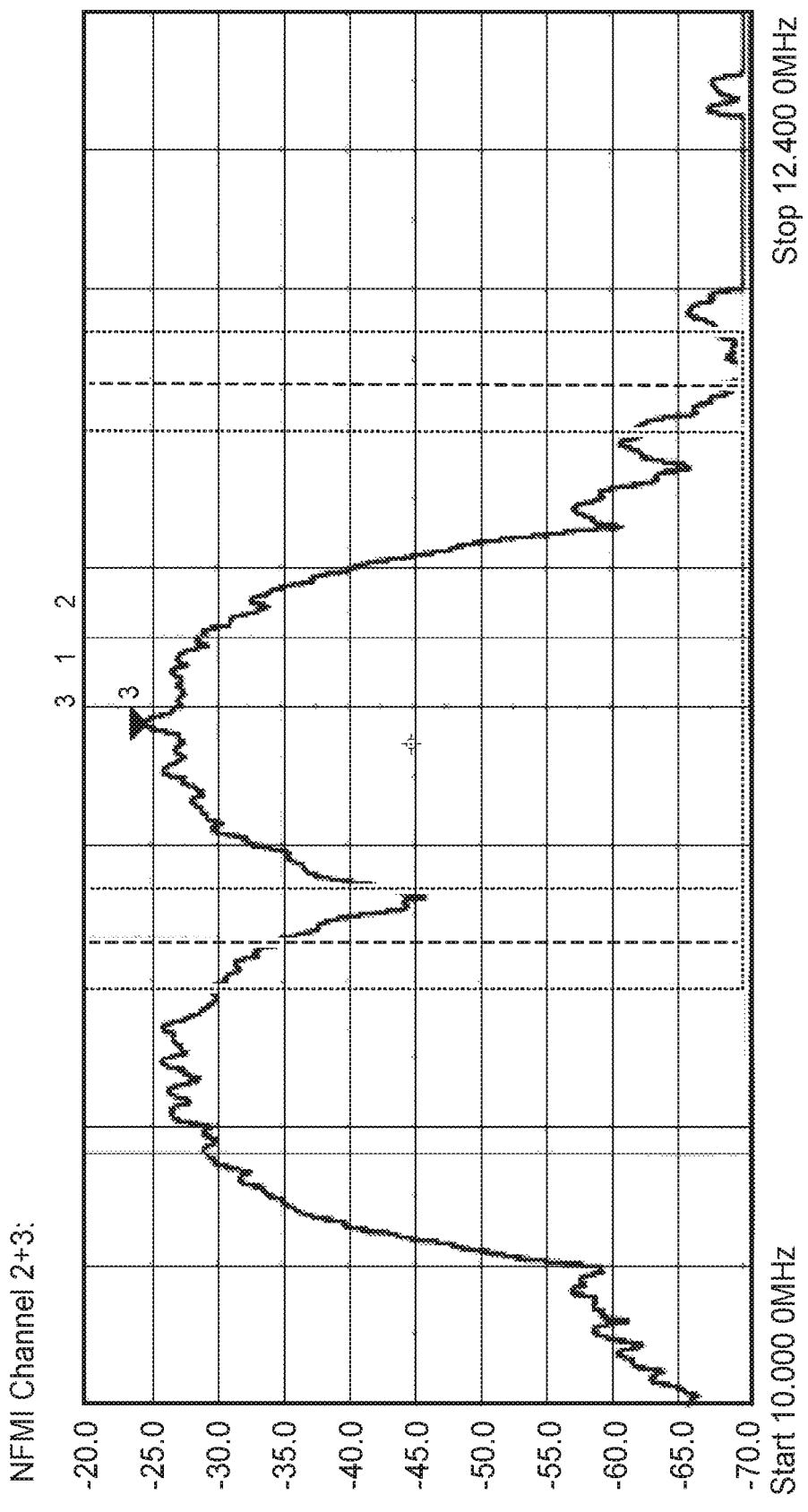

Four frequencies ("hop frequencies") were defined about the 10.6 MHz nominal, so that 4 simultaneous users can each operate on a unique (instead of the same) frequency, thus eliminating interferences. 10, 10.6, 11 and 11.7 MHz were chosen. The NFMI frequency spectral shapes of 10.6 MHz (Channel 2), 11 MHz (Channel 3) and 11.7 MHz (Channel 4) are shown in FIGS. 7A and 7B.

Example 2

The Example system consists of a control unit (creator), headset (joiner) and two earpieces (two joiners). There are four devices in one NFMI network therefore the length of the super frame is =(number of devices+1)*block size=(4+1)*15=75 slots.

SCU and Headset use hosted apps and have communication with N×H (NFMI radio chip from NXP Corporation, either N×h2281 or N×h2261) from the host processor using the i2c interface. Earpiece uses the standalone N×H application.

The state diagram of the NFMI functionality. The joiner or creator functionality is chosen based on the configuration. Algorithms used in searching, created, connected, join and joined states are presented in the next slides. The earpiece uses standalone N×H application to achieve this functionality.

A 75 slots super frame, shown in FIG. 8A, was used to achieve the TDMA protocol of simultaneously having communication between 4 devices at the same time. FIG. 8A shows the first 25 slots of the super frame and how the slots are assigned to differently. For example, slot #0 and #15 are the control slots, slot #1 to #4 are audio slots, slot #5 is data slot and slot #9 is idle slot.

Figure 8B:
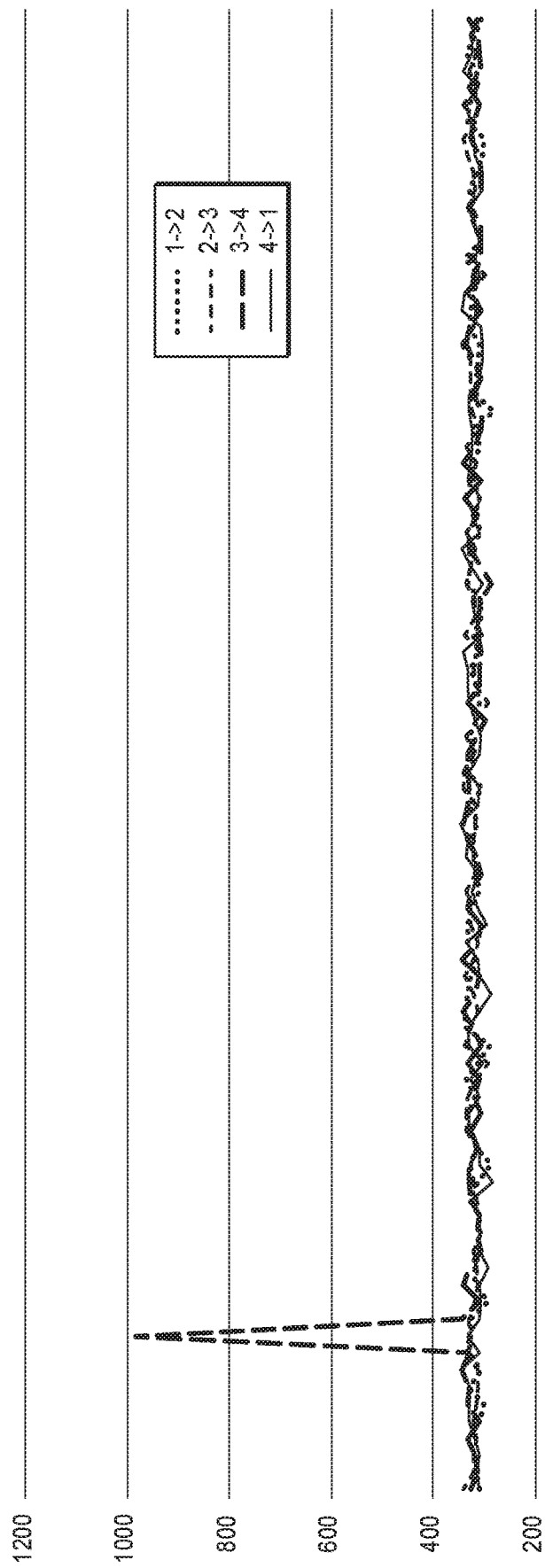
Figure 8C:
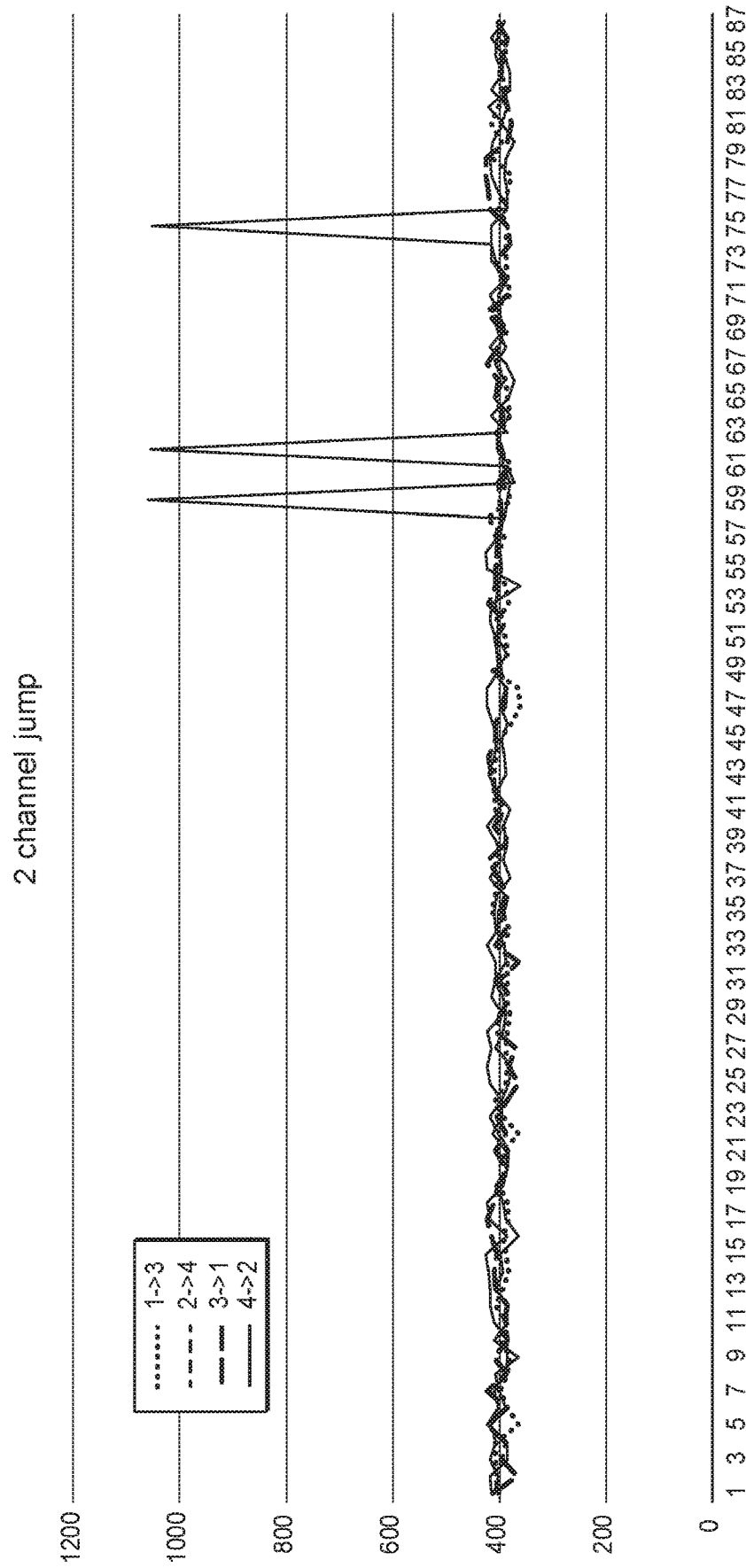
Figure 8D:
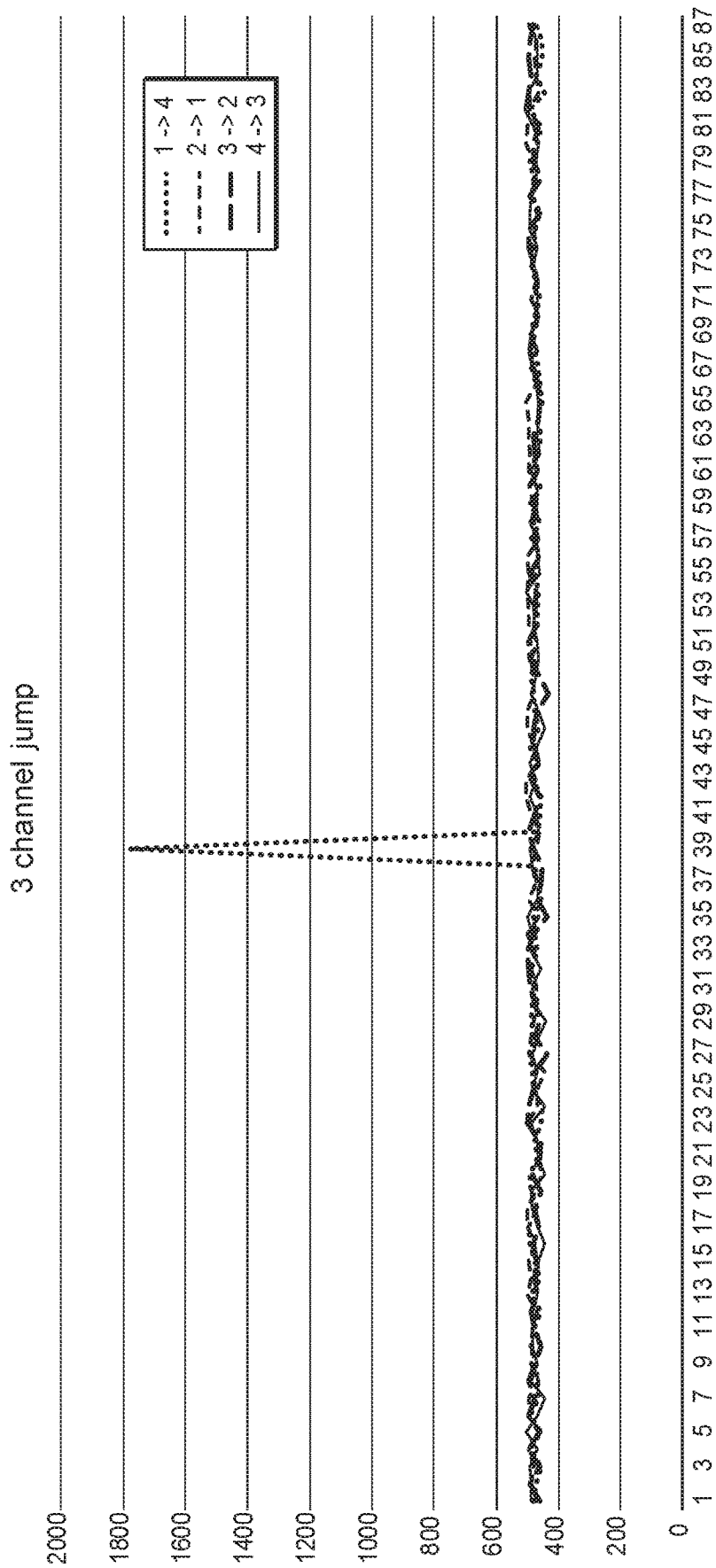

The re connection time is ~350 ms in average (as illustrated in FIGS. 8B-8D, where the y axis represents the reconnection time in ms and x axis represents the trial number, title indicates the number of channels jumped) so that the communication is seamless, and the end user does notice any drop pouts.

With frequency hopping on four NFMI radio frequencies and fast reconnection times (~<350 ms) now the system can handle up to 4 units at the same time at one constant place and more than 5 systems when constantly moving without any noticeable dropouts.

Both Internal and external Field trial results showed that this was the case.

What is claimed is:

1. A short-range communication system comprises:
    a system control unit comprising:
        a network creator configured to create a short-range network on a wireless frequency;
        an interference detector configured to detect a device on an interfering frequency; and
        a control unit frequency hopper configured to, based on the detected device, scan a frequency range for an open frequency and switch the system control network to the open frequency in response to detecting the device on the interfering frequency; wherein the open frequency is a scanned frequency with a substantially zero energy reading; and
    a personal protective equipment device comprising:
        a network joiner configured to join the short-range network; and
        a device frequency hopper configured to switch the personal protective equipment device to the open frequency.

2. The short-range communication system of claim 1, wherein the short-range network is a Near Field Magnetic Induction (NFMI) network.

3. The short-range communication system of claim 1, wherein the detected device is operating on a substantially identical frequency to the wireless frequency.

4. The short-range communication system of claim 1, wherein the detected device is operating on a frequency that is within 0.5 MHz of the wireless frequency.

5. The short-range communication system of claim 1, wherein the personal protective equipment device is configured to detect that the system control unit has left the wireless frequency, and wherein the personal protective equipment device comprises a personal protective equipment frequency scanner that scans the frequency range for the system control unit.

6. A method of changing operational frequencies of a short-range communication system, the method comprising:
    operating the short-range communication system on a short-range wireless network using a frequency;
    detecting, using an interference detector, a system operating on an interfering frequency;
    scanning, using a frequency scanner, an available frequency range for an open frequency in response to detecting the system on the interfering frequency; wherein the open frequency is a scanned frequency with a substantially zero energy reading;
    switching, using a frequency hopper, to the open frequency;
    joining a device to a new wireless network on the open frequency; and
    wherein the steps of scanning, switching and joining are done automatically by a system control unit in response to the detected system.

7. The method of claim 6, wherein the wireless network is a Near Field Magnetic Induction (NFMI) network.

8. The method of claim 6, wherein scanning the available frequency range comprises scanning a plurality of preset frequencies within the range.

9. The method of claim 6, wherein scanning the available frequency range comprises stepping through the available frequency range and scanning each of a series of frequencies within the available frequency range.

10. The method of claim 6, and also comprising authenticating the device requesting to join a network.

11. The method of claim 6, and also comprising sending a signal to the device indicative of the detected interference.

12. The method of claim 6, and also comprising sending a signal to the device indicative of the open frequency.

13. The method of claim 6, and further comprising: communicating with the detected system on a wireless protocol other than the short-range wireless network.

14. The method of claim 13, wherein communicating comprises sending or receiving an audio or data signal using the wireless protocol.

15. A method of hopping frequencies for a device comprises:
    operating the device in a wireless network on a first frequency;
    detecting that a creator device on the wireless network has left the first frequency;
    scanning, using a frequency scanner, an available frequency range for the creator device, further comprising searching for a carrier on a first frequency and, if the carrier is not detected within a configurable timeout range, switching to a second frequency and searching again;
    jumping, automatically, based on the detected lost creator device, to a new frequency containing the creator device; and joining, automatically, a network created by the creator device on the new frequency.

16. The method of claim 15, wherein scanning the available frequency range comprises checking a scanned frequency for the creator device.

17. The method of claim 15, wherein operating in a wireless network comprises receiving an audio or data signal from the creator device on the first frequency.

18. The method of claim 15, wherein detecting that the creator device has left comprises:
   a timeout;
   a received signal indicating an interference; or
   a received new frequency indication.

19. The method of claim 15, wherein the scanning continues through a plurality of frequencies until the carrier is discovered.

20. The method of claim 19, wherein the plurality of frequencies are predetermined.

21. The method of claim 20, wherein both the device and the creator device are configured to operate on a lowest available preset frequency and scan to the next lowest available frequency when interference is detected.

* * * * *